United States Patent [19]

Lusch et al.

[11] Patent Number: 4,967,414
[45] Date of Patent: Oct. 30, 1990

[54] LRU ERROR DETECTION USING THE COLLECTION OF READ AND WRITTEN LRU BITS

[75] Inventors: Robert F. Lusch, Vestal, N.Y.; Jeffrey J. Dulzo, Columbus, Ohio

[73] Assignee: International Business Machines Corp., Armonk, N.Y.

[21] Appl. No.: 294,021

[22] Filed: Jan. 6, 1989

[51] Int. Cl.[5] ............................................ G06F 11/10
[52] U.S. Cl. .................................. 371/51.1; 364/200
[58] Field of Search ................... 371/16.5, 29.5, 51.1; 364/200, 900

[56] References Cited

U.S. PATENT DOCUMENTS

| | | | |
|---|---|---|---|
| 4,298,929 | 11/1981 | Capozzi | 364/200 |
| 4,323,968 | 4/1982 | Capozzi | 364/200 |
| 4,483,003 | 11/1984 | Beal | 371/51.1 |
| 4,490,782 | 12/1984 | Dixon et al. | 364/200 |
| 4,807,110 | 2/1989 | Pomerene et al. | 364/200 |
| 4,831,625 | 5/1989 | Chiu et al. | 371/51.1 |
| 4,833,601 | 5/1989 | Barlow et al. | 364/200 |
| 4,835,686 | 5/1989 | Furuya et al. | 364/200 |

Primary Examiner—Charles E. Atkinson
Attorney, Agent, or Firm—John C. Black; Richard E. Bee

[57] ABSTRACT

At least-recently used (LRU) storage means and its associated logic maintain usage history for associativity class entries of a cache directory. The storage means includes an independent storage array for each of the bit positions of an LRU binary code pattern. Parity bits are provided in the arrays for each LRU bit. Separate read/write controls simultaneously write updated LRU bits to some of the arrays and read out unchanged LRU bits from the remaining arrays during updating of a usage history entry when its associativity class is used. Pattern checking logic collects the update bits and the unchanged bits during the update cycle to determine whether or not the new entry is a valid LRU combination. A parity bit is written with each of the update LRU bits written into the arrays and parity bits are read out from the arrays with the unchanged LRU bits for parity checking of each unchanged LRU bit during updating of usage history entries.

8 Claims, 5 Drawing Sheets

LRU ERROR DETECTION USING THE COLLECTION OF READ AND WRITTEN LRU BITS

RELATED APPLICATION

"Storage Array for LRU Apparatus" by R. W Furney et al., Ser. No. 293,973, filed of even date herewith and assigned to the same assignee as named herein.

BACKGROUND OF THE INVENTION

1. Field of Use

The present improvement relates to apparatus for maintaining information signifying the order of use of a plurality of units and more specifically to error detection means associated with the apparatus.

2. Prior art

In data processing systems having a plurality of units which are used in random sequence, there is a need to share the use of the various units; and to achieve an optimum level of performance, there is a further need to assign for each new use a unit which is least likely to require further utilization by the use currently assigned to the unit.

The preferred embodiment of the present improvement is incorporated in a cache storage system having high speed buffer storage (cache), a directory-look-aside-table (DLAT), and apparatus for maintaining and updating binary coded information related to the order of use of various sections of the buffer storage in accordance with a least recently used (LRU) replacement algorithm.

The cache and its DLAT are divided into a plurality of congruence classes and each congruence class includes a plurality of associativity classes. The LRU apparatus includes storage having one position for each congruence class and storing therein the usage data (LRU binary code) of the associativity classes of the respective congruence class. A description of such cache storage systems is found in many patents and publications, for example, U.S. Pat. No. 3,588,829, entitled, "Integrated Memory System With Block Transfer To A Buffer Store", issued to Boland, et al on June 28, 1971 and assigned to the assignee of the present invention.

During the operation of known cache systems of this type, the LRU binary code for each congruence class is updated with each successful access to (use of) a cache storage (often referred to as a cache line) area corresponding to one of the associativity classes of the congruence class of interest. Depending upon which associativity class is selected for access, certain LRU bits of the binary code must be updated. Remaining bits of the binary code do not require updating because they maintain the history of previous accesses and do not change.

The LRU function in a cache design records the order in which cache lines have been accessed within each congruence class. When a cache congruence class is filled and a cache line load to that congruence class is required, the LRU binary code for the congruence class is used to determine which associativity class in the congruence class has been used least recently. The data in the least recently used cache line is then replaced with the new data. This LRU information is encoded in the binary code associated with each cache congruence class. The number of bits in the binary code is dependent upon the number of associativity classes per congruence class. The function of the LRU demands that the binary code be updated every time an access is made to a congruence class, so that an accurate history of accesses can be maintained.

The LRU function spends the majority of its time recording the order in which cache associativity classes are accessed in each congruence class. When required by a cache miss, the LRU pattern is read from the array, decoded, and used to indicate the least recently used associativity class which then will be replaced with new data. If the LRU array, the update logic or the controls fail, the cache may continue to supply valid data but the error is likely to cause unnecessary line loading which may reduce system performance. The amount of performance degradation depends on the specific failure but may be significant. Thus, early detection of such errors is advantageous.

Because not all LRU bits in an LRU binary code are updated during successful accesses to the cache, known systems have typically read out, from the appropriate LRU storage position, all of the binary code bits, both those requiring update and those that do not. The former bits are updated and all bits, updated and non-updated, are returned to the storage position. This is referred to in the prior art as a READ/MODIFY/WRITE (RMW) cycle for update operations.

It is necessary for acceptable system performance to successfully perform the RMW cycle during a CPU system cycle. As system speeds increase, the RMW cycle places limitations on system cycle times.

To obviate this system limitation, it has been suggested that the LRU storage be implemented with a plurality of individually and separately addressable storage arrays, one for each bit position in the LRU binary code. Separate read/write controls for each array permit a write-only operation by gating off the write controls for those bits which should not be changed.

During each LRU update, only certain of the binary code bit positions of the LRU arrays are written into; no binary code bits are read out for the function of "updating" because the "write only" update function is complete without a READ subcycle. Therefore, no RMW type of operation is required.

To provide error detection, each of the separately addressable arrays includes two bit positions for each congruence class, one for the LRU bit and one for a parity bit. When LRU bits are written into the arrays, an appropriate parity bit is generated and stored with each LRU or modify bit. Parity checking is performed for an LRU binary code when it becomes necessary to transfer data from main storage of the data processing system to the cache line corresponding to the binary code within the pertinent congruence class.

This implementation does present some error detection problems, however. Since the binary code update writes only to selected bits, the unselected bits remain unchanged in the array. Therefore, the entire LRU binary code is not readily available for verification during updates. If checking is omitted during updating, then detection of an LRU binary code error may not occur until much later then the binary code is used to select the least recently used associativity class during a cache line load. Detecting these errors much later than the original time of failure makes determination of the cause of the original error more difficult. The present improvement teaches a method of verifying LRU binary codes immediately after each update to allow detection of errors at the time of failure.

It is therefore a primary object of the present invention to provide an improved error checking method and means.

SUMMARY OF THE INVENTION

The LRU error detection method and means of the present improvement checks updated binary codes by collecting the bits which are being written and the bits which remain unchanged to determine if they form a valid LRU bit pattern. This is done without affecting the machine cycle time or the LRU array access time by reading out the unchanged bits simultaneously with writing the new bits into the LRU arrays and checking the new and unchanged bits to verify a valid bit pattern.

The foregoing and other objects, features and advantages of the improvement will be apparent from the following description of the preferred embodiment illustrated in the accompanying drawings.

DETAILED DESCRIPTION OF THE INVENTION

Figure 1:
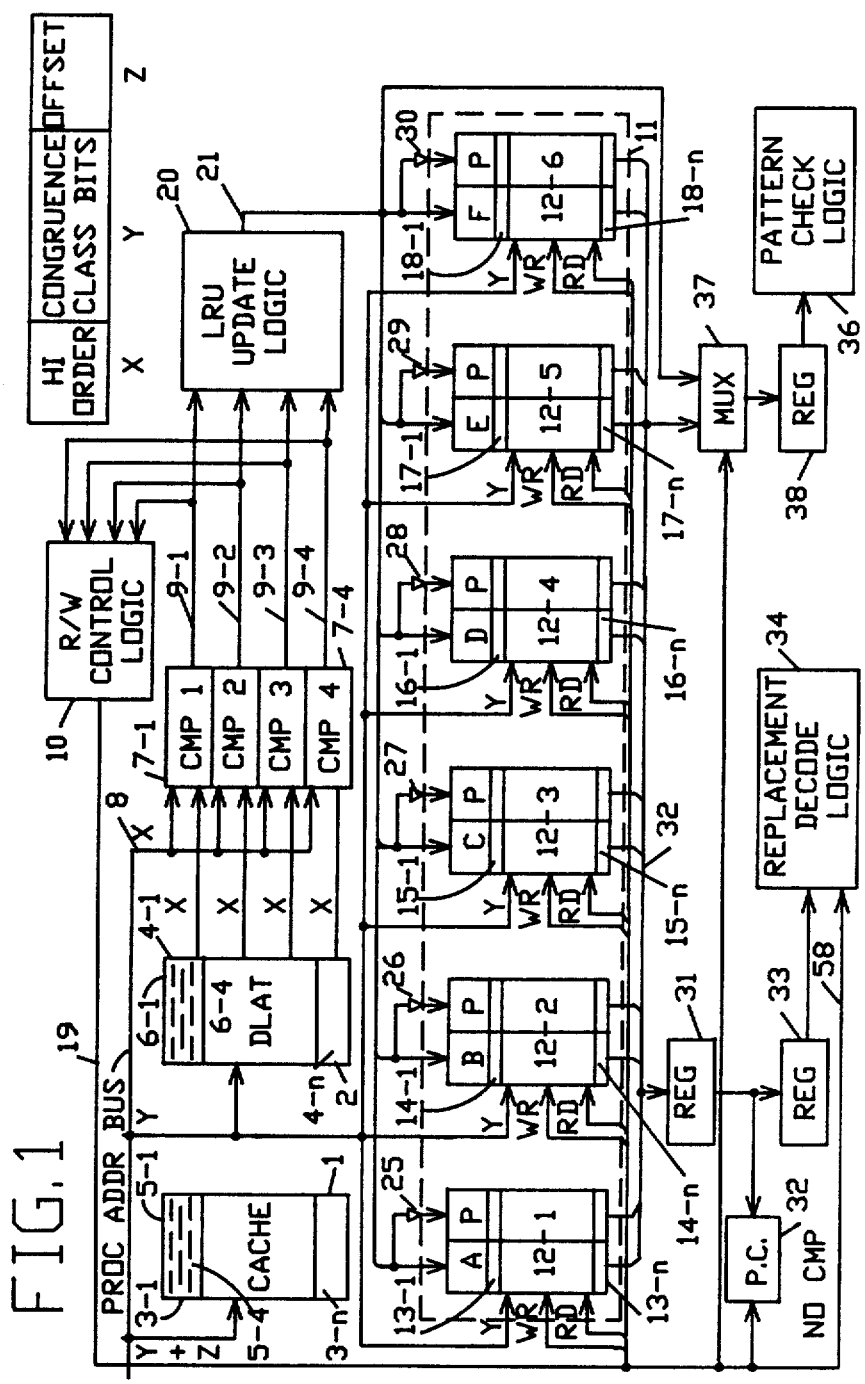
FIG. 1 is a diagramatic illustration of a cache storage system incorporating a preferred form of the improved error detection mechanism.

FIG. 1 illustrates a preferred environment within which the present improvement may be utilized, i.e., a cache storage system. However, it will be appreciated that the improvement is equally useful in a high performance system in which a DLAT is used for fast translation of addresses to access a main storage, no cache being provided.

A cache storage system is shown which includes a cache 1 and its DLAT 2, which are divided respectively into a plurality of congruence classes 3-1 to 3-n and 4-1 to 4-n. For ease of understanding, these may be considered as rows a two-dimensional array. In a typical system, n will equal 128. Each cache congruence class is further divided into a number of associativity classes, shown here as four 5-1 to 5-4, and each DLAT congruence class is divided into an equal number of associativity classes 6-1 to 6-4. Conceptually, these may be thought of as columns of a two-dimensional array. Four compare circuits 7-1 to 7-4 inclusive determine whether or not the data addressed via a processor address bus 8 is resident in the cache. The address (x+y+z) on bus 8 simultaneously addresses the cache 1, and DLAT 2 and provides selected high order address bits (x) to the compare circuits 7-1 to 7-4. When a congruence class of DLAT 2 is accessed using portion y of the address (x+y+z) on bus 8, it transfers the high order address portions x' stored in its four associativity classes to the four compare circuits 7-1 to 7-4. If one of the four high order address portions x' compares equal to the corresponding high order address portion x of the address on bus 8, the respective compare circuit puts a signal on the respective line 9-1 to 9-4 indicating that the desired data resides in the cache at the "selected" associativity and congruence classes, i.e., there is a cache "hit".

Outputs 9-1 to 9-4 inclusive of compare circuits 7-1 to 7-4 are coupled to Read/Write (R/W) control logic 10 which in turn provides Read (RD) and Write (WR) inputs to LRU storage 11 via bu 19. In this case, the LRU algorithm requires a six-bit binary co hence the storage 11 includes six independent 128>2 LRU arrays 12-1 to 12-6, one for each bit position. Each LRU array such as 12-1 includes an entry corresponding to each congruence class of cache 1 and DLAT 2. Thus arrays 12-1 to 12-6 have congruence class entries 13-1 to 13-n, 14-1 to 14-n, 15-1 to 15-n, 16-1 to 16-n, 17-1 to 17-n, 18-1 to 18-n, respectively. The entries are accessed via the congruence class bits y of address bus 8.

Outputs 9-1 to 9-4 are coupled to LRU update logic 20 which in turn provides data inputs to the LRU arrays 12-1 to 12-6 via bus 21. These inputs are shown as bits A-F inclusive of arrays 12-1 to 12-6, respectively, the bits A-F representing the six bits of the LRU binary code.

Inverters 25-30 provide odd parity check bit inputs for the second bit positions of the congruence class entries in arrays 12-1 to 12-6.

When the LRU bits A-F and the parity bits in the arrays 12-1 to 12-6 are read out, they are stored into a register 31 via bus 32. A parity check circuit 32a coupled to the register 31 checks the parity of the bits in register 31 during LRU update operations and when a cache "miss" occurs. When a cache miss occurs the appropriate LRU bits are transferred from the arrays 12-1 to 12-6 to the register 31, then to register 33. A replacement algorithm decode logic circuit 34 determines which associativity class (the least recently used) is selected for replacement.

The LRU data update bus 21 and the LRU data output portion of bus 32 are coupled to LRU pattern checking logic 36 via a multiplexor 37 and a register 38. Gating within the mulitplexor 37 is determined by Read and Write signals on bus 19.

As described above a six-bit binary code is used to represent the order of use of four associativity classes 1-4 of each congruence class. The six bit code has 64 logical combinations, only 24 of which are valid for use in the LRU algorithm. The six bits are referred to by the letters A-F. Table I below shows the valid binary bit combinations for all possible sequences of use.

TABLE I

| Chronology Sequence | A 1A2 | B 1A3 | C 1A4 | D 2A3 | E 2A4 | F 3A4 |
|---|---|---|---|---|---|---|
| 1234 | 1 | 1 | 1 | 1 | 1 | 1 |
| 1243 | 1 | 1 | 1 | 1 | 1 | 0 |
| 1324 | 1 | 1 | 1 | 0 | 1 | 1 |
| 1342 | 1 | 1 | 1 | 0 | 0 | 1 |
| 1423 | 1 | 1 | 1 | 1 | o | o |
| 1432 | 1 | 1 | 1 | o | o | o |
| 2134 | o | 1 | 1 | 1 | 1 | 1 |
| 2143 | o | 1 | 1 | 1 | 1 | o |
| 2314 | o | o | 1 | 1 | 1 | 1 |
| 2341 | o | p | o | 1 | 1 | 1 |
| 2413 | o | 1 | o | 1 | 1 | o |
| 2431 | o | o | o | 1 | 1 | o |
| 3124 | 1 | o | 1 | o | 1 | 1 |
| 3142 | 1 | o | 1 | o | o | 1 |
| 3214 | o | o | 1 | o | 1 | 1 |
| 3241 | o | o | o | o | 1 | 1 |
| 3412 | 1 | o | o | o | o | 1 |
| 3421 | o | o | o | o | o | 1 |
| 4123 | 1 | 1 | o | 1 | o | o |
| 4132 | 1 | 1 | o | o | o | o |
| 4213 | o | 1 | o | 1 | o | o |

TABLE I-continued

| Chronology Sequence | A 1A2 | B 1A3 | C 1A4 | D 2A3 | E 2A4 | F 3A4 |
|---|---|---|---|---|---|---|
| 4231 | o | o | o | 1 | o | o |
| 4312 | 1 | o | o | o | o | o |
| 4321 | o | o | o | o | o | o |

In Table I, the leftmost value in the chronology sequence represents the "most" recently used associativity class and the rightmost value represents the "least" recently used associativity class. Thus the top table entry "1234" means that 1 is most recent, 2 is next most recent, then 3 and finally 4 is "least" recent. If a cache miss occurred, associativity class 4 would be selected for replacement.

The terms below the LRU bits signify valid sequence conditions; for example, 1A2 means that associativity class 1 was selected for use after associativity class 2; 1A3 means that associativity class 1 was selected for use after associativity class 3, and so on...

For each sequence, the LRU bit value under each term such as 1A2, 1A3 etc. is a logical "1" if the actual sequence does agree with the respective sequence condition. For example, in the sequence 1234, class 1 was selected for use after classes 2, 3, 4; class 2 was selected for use after classes 3 and 4; and class 3 was selected for use after class 4. Thus, all LRU bits are logical "1"s.

A logical "o" appears if the condition is not met; for example, in sequence 1243, a logical "o" appears under LRU bit F because class 3 was not selected for use after class 4; rather the opposite is true.

The update procedure for maintaining the LRU binary codes of Table 1 is set forth in Table II below. Each update occurs when the processor places a virtual address on bus 8 to successfully access cache 1, i.e. a cache bit. A compare equal signal appears on one of the lines 9-1 to 9-4, the one which corresponds to the compare circuit 7-1 to 7-4 that finds an associativity class entry having therein a high order virtual address value equal to the corresponding high order virtual address value on bus 8.

TABLE II

| Associativity Class | Update Action | LRU A | B | C | Binary Code Bits D | E | F |
|---|---|---|---|---|---|---|---|
| CMP=1 | Write | 1 | 1 | 1 | | | |
| CMP=2 | Write | o | | | 1 | 1 | |
| CMP=3 | Write | | o | | o | | 1 |
| CMP=4 | Write | | | o | | o | o |

Thus, when associativity class 1 raises a compare equal signal on line 9-1, binary "1" values are written into the LRU arrays for bits A, B, C at congruence class positions corresponding to the congruence class bits in the virtual address on bus 8.

Similarly, a compare equal for associativity class 2 causes binary values "0, 1, 1" to be written respectively into the LRU arrays for bits A, D, and E at the appropriate congruence class. Likewise, compare equal 3 writes "0,0,1" to arrays B, D, and F, while compare equal 4 writes "0,0,0" to arrays C, E, and F.

The unchanged bits for each update maintain the history of previous compares and must therefore be retained intact.

Figure 2:
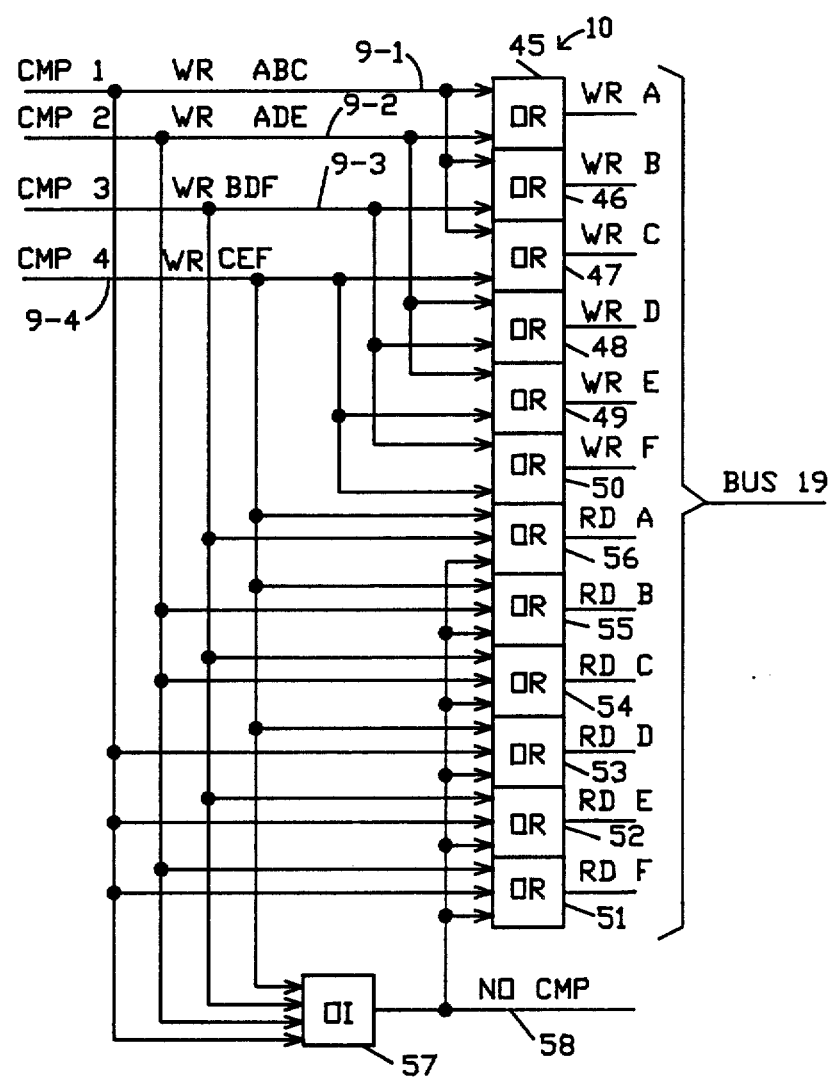
FIGS. 2 and 3 are schematic diagrams respectively of logical implementations of the read/writecontrol logic and the LRU update logic of the present improvement.
Figure 3:
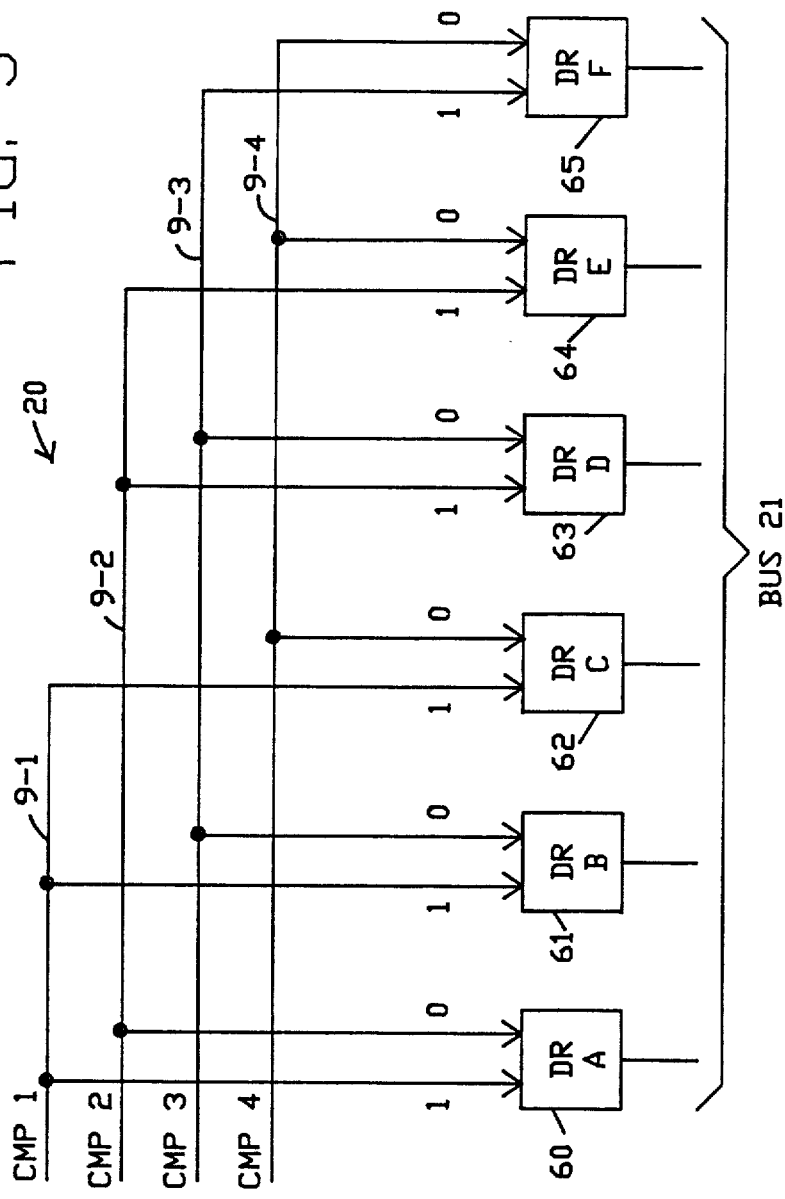

Referring again to FIG. 1 and to FIGS. 2 and 3, it will be seen that the arrays 12-1 to 12-6 and associated logic 10 and implement the LRU algorithm of Tables I and II above. Assume that the processor (not shown) places an address on bus 8 to access the cache 1. The congruence class bits y of the address select the four associativity classes of the appropriate congruence class in DLAT 2 and place their contents (the higher order address bits x') into compare circuits 7-1 to 7-4.

If the data sought by the address on bus 8 is in the cache 1, the high order bits stored in one of the four associativity classes will match (equal) the corresponding high order address bits on bus 8, causing an equal compare signal on one of the outputs 9-1 to 9-4.

FIG. 2 illustrates a logical implementation of the Read/Write control logic 10 corresponding to that described with respect to Table II. A compare equal signal on line 9-1 applies signals to lines Write A, Write B and Write C of bus 19 (FIG. 1) via OR circuits 45, 46, 47.

Similarly, a compare equal signal on line 9-2 applies signals to lines Write A, Write D, and Write E via OR circuits 45, 48, 49. A compare equal signal on line 9-3 raises signals on lines Write B, Write D, and Write F via OR circuits 46, 48, 50. A compare equal signal on line 9-4 raises signals on lines Write C, Write E, Write F via OR circuits 47, 49, 50.

For reasons to be explained below the signal on line 9-1 raises signals on lines Read D, E and F via OR gates 51, 52, 53; the signal on line 9-2 raises signals on lines Read B, C, F via OR circuits 55, 54, 51; the signal on line 9-3 raises signals on lines Read A, C, E via OR circuits 56, 54, 52; and the signal on line 9-4 raises signals on lines Read A, B, D via OR circuits 56, 55, 53.

When there is no equal compare signal on any of the lines 9-1 to 9-4 during an attempted cache access, i.e. a cache miss, an OR-INVERT circuit 57 raises signals on all the lines Read A-F inclusive to read out the appropriate LRU binary code to logic 34 to determine which associativity class will be replaced. Circuit 57 also raises a signal on line 58.

FIG. 3 illustrates a logical implementation of the LRU update logic 20 corresponding to that described with respect to Table II. The update logic 20 is independent of the current LRU value. A plurality of driver circuits 60–65 inclusive are provided, one for each array 12-1 to 12-6. Thus driver 60 drives the A DATA input of array 12-1, driver 61 drives the B DATA input of array 12-2 and so on . . .

Each driver circuit is provided with a logical 1 and a logical 0 input. A signal on a logical 1 input applies a logical 1 level on the output line which forms part of bus 21. A Signal on a logical 0 input applies a logical 0 level on the output.

Therefore, a compare equal signal on line 9-1 produces logical 1 signal levels on the A, B, C DATA inputs to arrays 12-1, 12-2, 12-3 via drivers 60, 61, 62 and bus 21. As described above, the compare equal signal on line 9-1 also raised the Write A, B, C lines. The congruence class address y signals select the appropriate congruence class in arrays 12-1 to 12-6, and the logical 1 bits are written into the arrays 12-1 to 12-3 at the selected congruence positions.

Similarly, a compare equal signal on line 9-2 causes logical bits 0, 1, 1 to be written into the arrays 12-1, 12-4, 12-5 via drivers 60, 63, 64, bus 21 and the A, D, E DATA inputs of the arrays.

A compare equal signal on line 9-3 causes logical bits 0, 0, 1 to be written into the arrays 12-2, 12-4, 12-6 via drivers 61, 63, 65, bus 21 and the B, D, F DATA inputs of the arrays.

A compare equal signal on line 9-4 causes logical bits 0, 0, 0 to be written into the arrays 12-3, 12-5, 12-6 via drivers 62, 64, 65, bus 21 and the C, E, F DATA inputs of the arrays.

Figure 4:
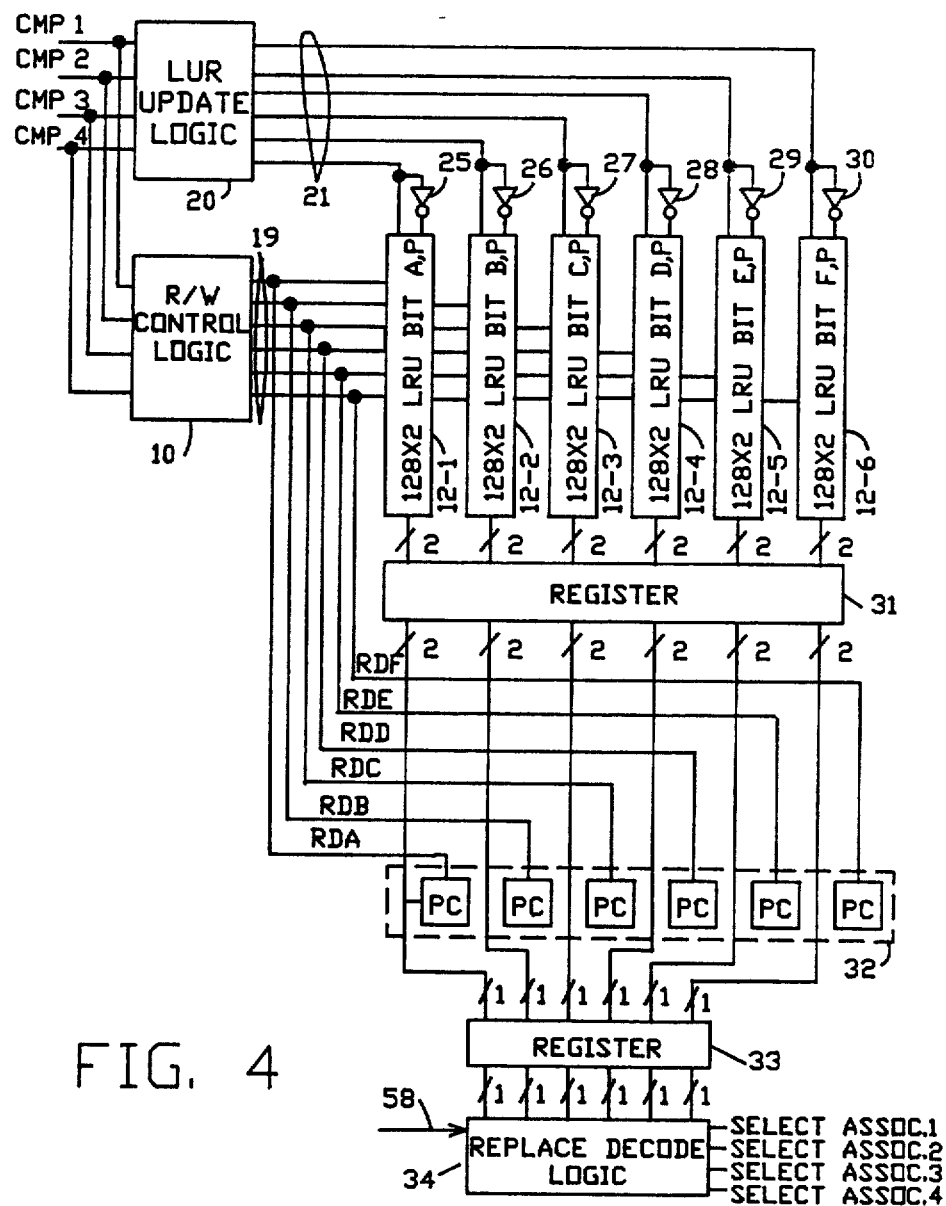
FIG. 4 illustrates the dataflow of the LRU function of the present improvement.

FIG. 4 illustrates the data flow of the LRU function and the parity generation, parity checking. Each time that LRU binary code data is written into three of the arrays, i.e. a cache "hit", odd parity is generated for each of the three written code bits by inverters 25-30.

As described with respect to FIG. 2, the three arrays which were not written into as a result of a cache "hit" are controlled by the appropriate OR circuits 51-56 to read data (LRU bit plus parity bit) from the appropriate congruence class position. This occurs simultaneous with the Write operation. The three sets of LRU/Parity bits are read into the parity check circuits 32 under control of the Read A-Read F lines (FIGS. 2 and 4). No checking of the written bit parity is made since the parity bits were just generated via inverters 25-30. However, the parity of the unchanged LRU bits is checked to determine errors as soon as possible.

When a cache "miss" occurs, the circuit 57 (FIG. 2) causes the readout from the arrays 12-1 to 12-6 of the entire LRU binary code. The parity check circuit 32 determines if there is a parity error in any of the bit positions of the LRU binary code; and, if no errors occur the LRU binary code is stored in register 33. The replacement decode logic 34 (FIG. 4) selects the appropriate associativity class for replacement with the data requested by the virtual address on processor bus 8.

Figure 5:
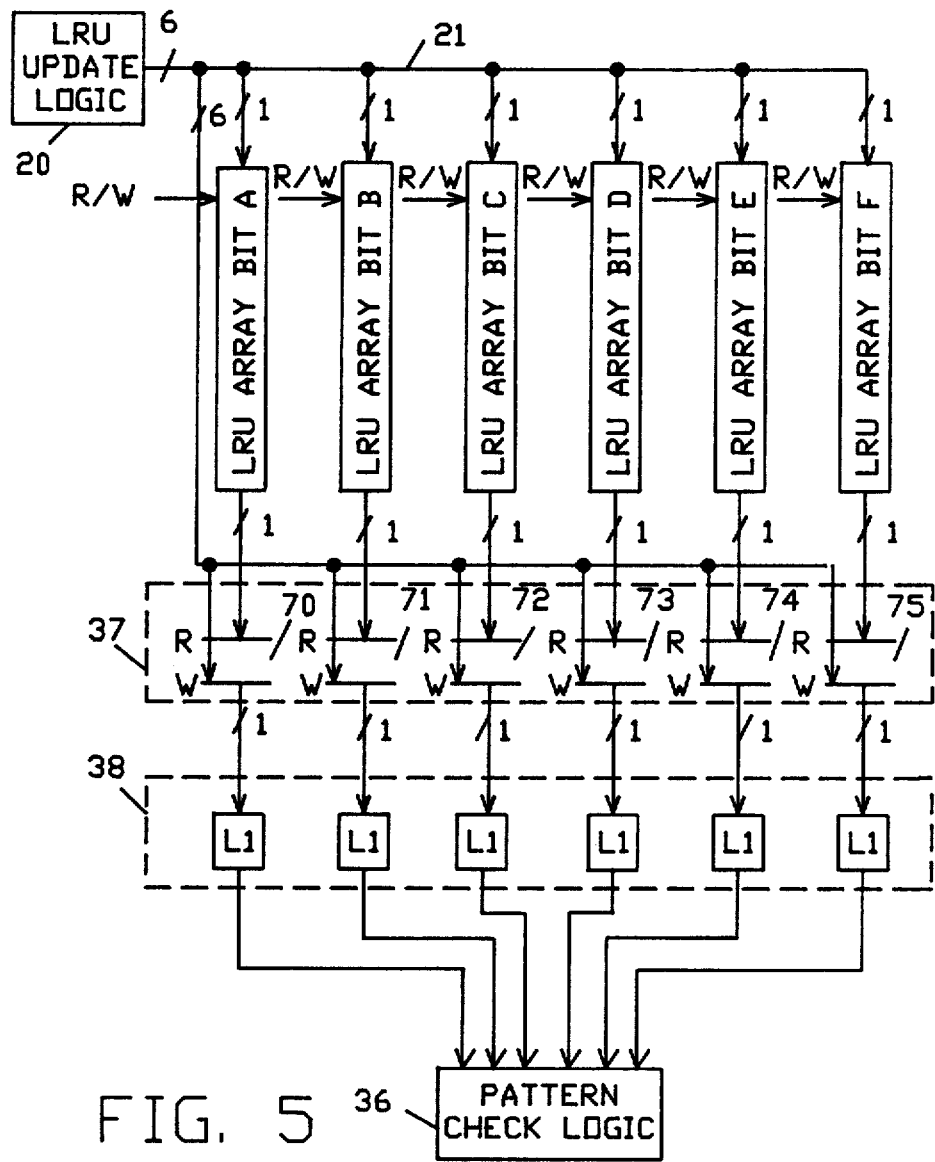
FIG. 5 illustrates the dataflow of the pattern checking function of the present improvement.

FIG. 5 illustrates the dataflow for the LRU pattern check function. Use of an illegal pattern (with good parity) could cause replacement of an entry other than the least recently used one during a line load, which may cause more frequent cache misses and degradation of system performance. Thus, checking for legal LRU patterns is desirable and can increase error detection beyond that provided by parity checking when a failure results in an illegal pattern which has proper parity.

There are many cases where proper parity can be maintained even though a failure occurred. If, for example, the update logic fails and produces an incorrect set of update bits, proper parity will be generated for each of these individual bits immediately before they are written into the LRU arrays. Therefore, correct parity will be maintained even though the pattern is erroneous. If the erroneous pattern is not one of the 24 valid combinations, the failure is detected by pattern checking.

Pattern checking is complicated in the preferred LRU implementation because the entire LRU pattern is not readily available during updates. In general, three of the six bits in a pattern are known since these bits are being written. The remaining three bits are held unchanged in the LRU arrays and therefore are not known. It is possible to delay verification until a pattern is read during a cache miss but detection of an error at this time will generally be many machine cycles after the original error occurred. The delay between the occurrence of the error and the detection of the error could make it impossible to determine the cause of the original failure.

The pattern checking method of the present improvement collects the bits which are to be written and the bits which are to remain unchanged and verifies the LRU pattern immediately after each LRU update. The three bits which are being written are known. The three bits which remain unchanged in their respective arrays are not readily available and must be obtained in order to check the LRU pattern. These three bit are obtained by reading the three arrays whose bits are unchanged at the same time the other three arrays are writing their updated bits. Hence, the entire pattern can be collected from the two sources and verified.

Thus, as seen in FIG. 5, respective DATA input lines A-F of update logic bus 21 form data inputs to multiplexing elements 70-75 of multiplexor 37. The Write A-Write F lines (FIG. 2) form gating inputs to elements 70-75. The LRU A-F outputs of arrays 12-1 to 12-6 form second data inputs to the elements 70-75. The Read A-Read F lines form gating inputs to the elements 70-75.

As described above, during each LRU update operation three bits are written to the LRU arrays and the three other bits are read from the arrays. These six bits which form the new LRU binary code pattern are gated by the multiplexing elements 70-75 to the register 38 for validity checking by logic 36.

Thus, parity checking of unchanged LRU bits and pattern checking of the newly formed LRU pattern are accomplished during the update system write cycle without adding to the time required for the system cycle.

LRU error detection using the collection of read and written LRU bits takes advantage of independent bit R/W controls on the LRU arrays by doing a parallel read of unchanged bits when an update occurs. This makes the entire LRU pattern available for pattern checking after each update, allowing errors to be detected at the time of failure which facilitates failure analysis.

While the invention has been shown and described with reference to a preferred embodiment and modifications thereof, it will be understood by those skilled in the art that various changes in form and detail may be made therein without departing from the spirit and scope of the invention.

What is claimed is:

1. A system for producing and error checking a binary code pattern signifying the order of replacement of units in a plurality of units randomly used in sequence, comprising a plurality of storage elements, one for each logical bit in the pattern, for storing the pattern;

means associated with each of the units for producing signals indicating the use of the associated unit;

logic means, connected to the storage elements and to the signal producing means, for producing update bits for only certain of the pattern bits;

separate read/write controls connected to the signal producing means, for each storage element, for writing the update bits into only certain of said storage elements in accordance with said use signals and for reading unchanged pattern bits from the storage elements other than said certain elements;

means, connected to the logic means and to the storage elements, for collecting the updated pattern bits from the logic means and unchanged pattern bits from the storage elements; and pattern checking means connected to the collecting means for determining the validity or non-validity of the collected pattern.

2. The system of claim 1 wherein the reading and writing of the storage elements is performed concurrently.

3. In a system for producing a binary code signifying the order of use of units in a plurality of units randomly utilized in sequence including storage means for said binary code having separately selectable storage elements, one for each logical bit in the binary code, means associated with each of the units for producing signals indicating use of the associated unit, and logic means, connected to the storage elements and to the signal producing means, for updating only selected ones of the storage elements in accordance with said use signals, the combination therewith of apparatus for checking the validity of each updated binary code comprising means, connected to the storage elements and to the logic means, for collecting updated binary code bits from the logic means and unchanged binary code bits from the non-selected storage elements during updating of the storage elements; and pattern checking means connected to the collecting means for determining the validity of the collected bits as a binary code.

4. The combination of claim 3 wherein the collecting means comprises a register for storing collected binary code bits, and multiplexor means responsive to the logic means for transferring to the register (1) logical bits from the logic means used to update said selected storage elements and (2) logical bits from non-selected storage elements, said pattern checking means being connected to the register.

5. The combination of claim 3 further comprising means, connected to the storage elements and to the logic means for producing and storing a parity bit for each updated binary code bit; and means, connected to the storage elements and to the logic means, for checking the parity of the parity and binary code bits of the unselected storage elements during updating of the storage elements.

6. In a system for producing and error checking a binary code pattern signifying the order of use of units in a plurality of units randomly utilized in sequence, including storage means for said binary code pattern having separately selectable storage elements, one for each logical bit in the binary code pattern, means associated with each of the units for producing signals indicating use of the associated unit, first logic means, connected to the storage elements and to the signal producing means, for creating updated binary code pattern bits for storage in only selected ones of the storage elements in accordance with said use signals, and second logic means, connected to the storage elements and to the signal producing means, for writing the updated binary code pattern bits into said selected storage elements, the combination therewith of apparatus for checking the validity of each updated binary code pattern during updating, comprising said second logic means including means for applying Write signals to the selected storage elements and Read signals to the non-selected storage elements during updating of the binary code pattern, means, connected to the storage elements and to the first and second logic means, for collecting updated binary code pattern bits from the first logic means and unchanged binary code pattern bits from the non-selected storage elements, and pattern checking means connected to the collecting means for determining whether or not the collected bits form a valid binary code pattern.

7. The combination of claim 6 wherein the collecting means comprises a register for storing collected binary code pattern bits, and multiplexor means responsive to the Write and Read signals for transferring to the register (1) logical bits from the first logic means used to update said selected storage elements and (2) non-changed logical bits from non-selected storage elements to form a new, updated binary code pattern, said pattern checking means being connected to the register.

8. The combination of claim 7 further comprising means, connected to the first logic means and to the storage elements, for producing and storing parity bits in selected storage elements during updating; and means, connected to the second logic means and to the storage elements, for checking the parity of the bits read from the unselected storage elements during updating.

* * * * *